US009557923B2

(12) United States Patent
Bish et al.

(10) Patent No.: US 9,557,923 B2
(45) Date of Patent: *Jan. 31, 2017

(54) BLOCK-LEVEL PREDICTIVE DATA MIGRATION

(71) Applicant: International Business Machines Corporation, Armonk, NY (US)

(72) Inventors: Thomas W. Bish, Tucson, AZ (US); Gregory E. McBride, Vail, AZ (US); David C. Reed, Tucson, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/041,978

(22) Filed: Feb. 11, 2016

(65) Prior Publication Data

US 2016/0162206 A1 Jun. 9, 2016

Related U.S. Application Data

(63) Continuation of application No. 14/296,555, filed on Jun. 5, 2014, now Pat. No. 9,285,994.

(51) Int. Cl.
*G06F 3/06* (2006.01)

(52) U.S. Cl.
CPC ............ *G06F 3/0616* (2013.01); *G06F 3/061* (2013.01); *G06F 3/064* (2013.01); *G06F 3/067* (2013.01); *G06F 3/0647* (2013.01); *G06F 3/0653* (2013.01); *G06F 3/0665* (2013.01); *G06F 3/0673* (2013.01); *G06F 3/0689* (2013.01); *G06F 2003/0692* (2013.01)

(58) Field of Classification Search
CPC ........ G06F 3/061; G06F 3/064; G06F 3/0647; G06F 3/0653; G06F 3/0655; G06F 3/0665; G06F 3/067; G06F 3/0685; G06F 3/0689; G06F 2003/0692
USPC .................................................. 711/117, 137
See application file for complete search history.

(56) References Cited

U.S. PATENT DOCUMENTS

| 7,512,289 | B2 | 3/2009 | Scheier et al. |
| 8,566,483 | B1 | 10/2013 | Chen et al. |
| 2010/0115211 | A1 | 5/2010 | de la Iglesia et al. |
| 2011/0010514 | A1 | 1/2011 | Benhase et al. |

(Continued)

FOREIGN PATENT DOCUMENTS

GB 2493243 A 1/2013

*Primary Examiner* — Gary Portka
(74) *Attorney, Agent, or Firm* — Nelson and Nelson; Daniel P. Nelson; Alexis V. Nelson

(57) ABSTRACT

An apparatus for migrating data in a tiered storage architecture includes one or more processors and one or more memory devices coupled to the processors and storing instructions for execution by the processors. The instructions cause the one or more processors to: track temperature (i.e., frequency of access) of data blocks in a tiered storage architecture; generate heat maps indicating the temperature of the data blocks across different time intervals; process the heat maps using an image processing algorithm; compress the heat maps to reduce the size of the heat maps; compare the heat maps from the time intervals to identify temperature patterns occurring over time; predict, from the temperature patterns, when selected data blocks will change in temperature; and migrate the selected data blocks between tiers of the tiered storage architecture in anticipation of their changes in temperature.

11 Claims, 8 Drawing Sheets

(56) References Cited

U.S. PATENT DOCUMENTS

2012/0137061 A1    5/2012   Yang et al.
2014/0095790 A1    4/2014   Chambliss et al.
2015/0006788 A1    1/2015   Liu et al.

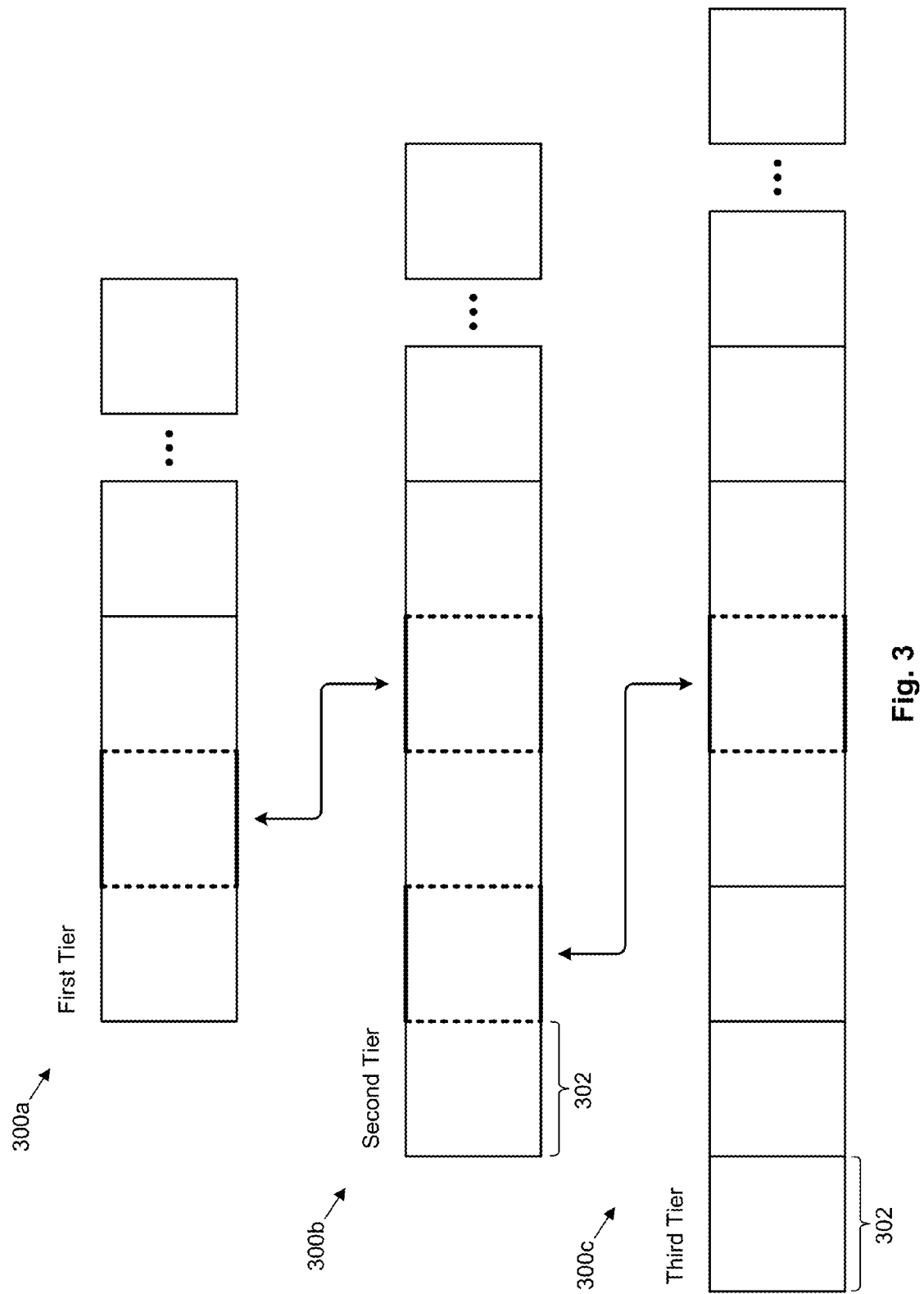

BLOCK-LEVEL PREDICTIVE DATA MIGRATION

BACKGROUND

Field of the Invention

This invention relates to apparatus and methods for migrating data in a tiered storage architecture.

Background of the Invention

In today's tiered storage architectures, the "hotness" or "coldness" of data may be continually monitored so that it can be optimally placed on storage media. For example, "hot" (i.e., frequently accessed) data may be placed on faster, more expensive storage media (e.g., solid state drives) to improve I/O performance. "Cold" (i.e., less frequently accessed) data may be placed on slower, less expensive storage media (e.g., hard disk drives) with reduced I/O performance. As the temperature of the data changes, the data may be migrated between storage tiers to optimize I/O performance.

In tiered storage architectures, determining when to migrate data as well as what data to migrate is a significant issue. Some tiered storage architectures may promote an entire file or dataset to higher performance storage media even though only portions of the file or dataset are accessed on a regular basis. This may utilize the higher performance storage media in an inefficient manner and potentially displace more frequently accessed data from the higher performance storage media.

The timing associated with migrating data may also be an important issue, since it may significantly affect I/O performance. In some cases, migrating data to higher performance storage media when the data is in high demand may significantly reduce I/O performance and throughput during the migration. Migrating data at inopportune times may be self-defeating as the goal of the migration may be that of ultimately improving I/O performance.

In view of the foregoing, what are needed are apparatus and methods to more optimally migrate data in tiered storage architectures. Ideally, such apparatus and methods will improve I/O performance and throughput by more optimally addressing when to migrate data and what data to migrate.

SUMMARY

The invention has been developed in response to the present state of the art and, in particular, in response to the problems and needs in the art that have not yet been fully solved by currently available apparatus and methods. Accordingly, apparatus and methods are disclosed to more optimally migrate data in tiered storage architectures. The features and advantages of the invention will become more fully apparent from the following description and appended claims, or may be learned by practice of the invention as set forth hereinafter.

Consistent with the foregoing, an apparatus for migrating data in a tiered storage architecture is disclosed. In one embodiment, the apparatus includes one or more processors and one or more memory devices coupled to the processors and storing instructions for execution by the processors. The instructions cause the one or more processors to: track temperature (i.e., frequency of access) of data blocks in a tiered storage architecture; generate heat maps indicating the temperature of the data blocks across different time intervals; process the heat maps using an image processing algorithm; compress the heat maps to reduce the size of the heat maps; compare the heat maps from the time intervals to identify temperature patterns occurring over time; predict, from the temperature patterns, when selected data blocks will change in temperature; and migrate the selected data blocks between tiers of the tiered storage architecture in anticipation of their changes in temperature.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 3 is a high-level block diagram showing movement of data blocks between tiers of a tiered storage architecture;

DETAILED DESCRIPTION

Figure 1:
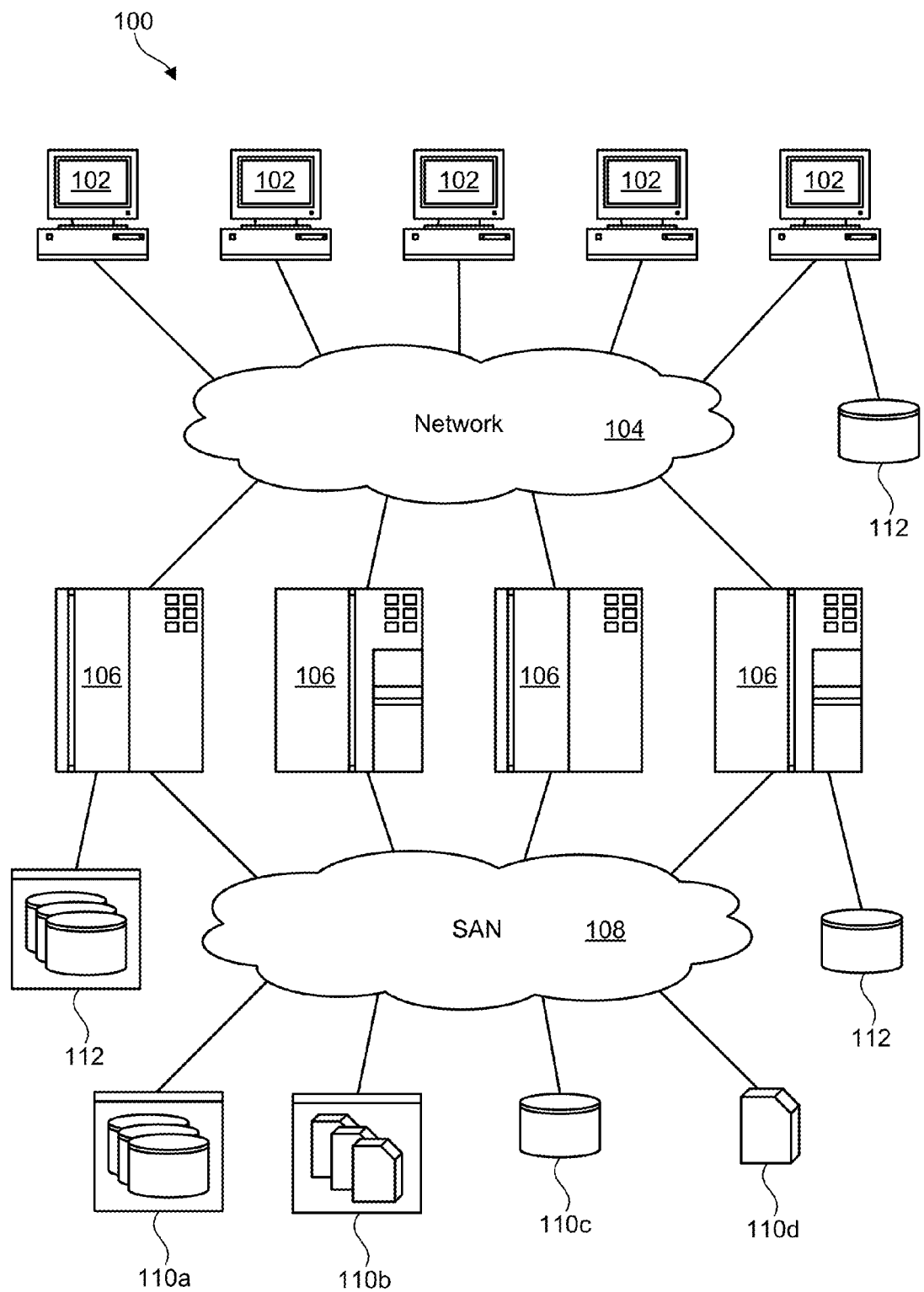
FIG. 1 is a high-level block diagram showing one example of a network architecture in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a storage network architecture 100 is illustrated. The storage network architecture 100 is presented to show one example of an environment where an apparatus and method in accordance with the invention may be implemented. The storage network architecture 100 is presented only by way of example and not limitation. Indeed, the apparatus and methods disclosed herein may be applicable to a wide variety of network architectures, in addition to the storage network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the apparatus and methods disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the apparatus and methods disclosed herein.

Figure 2:
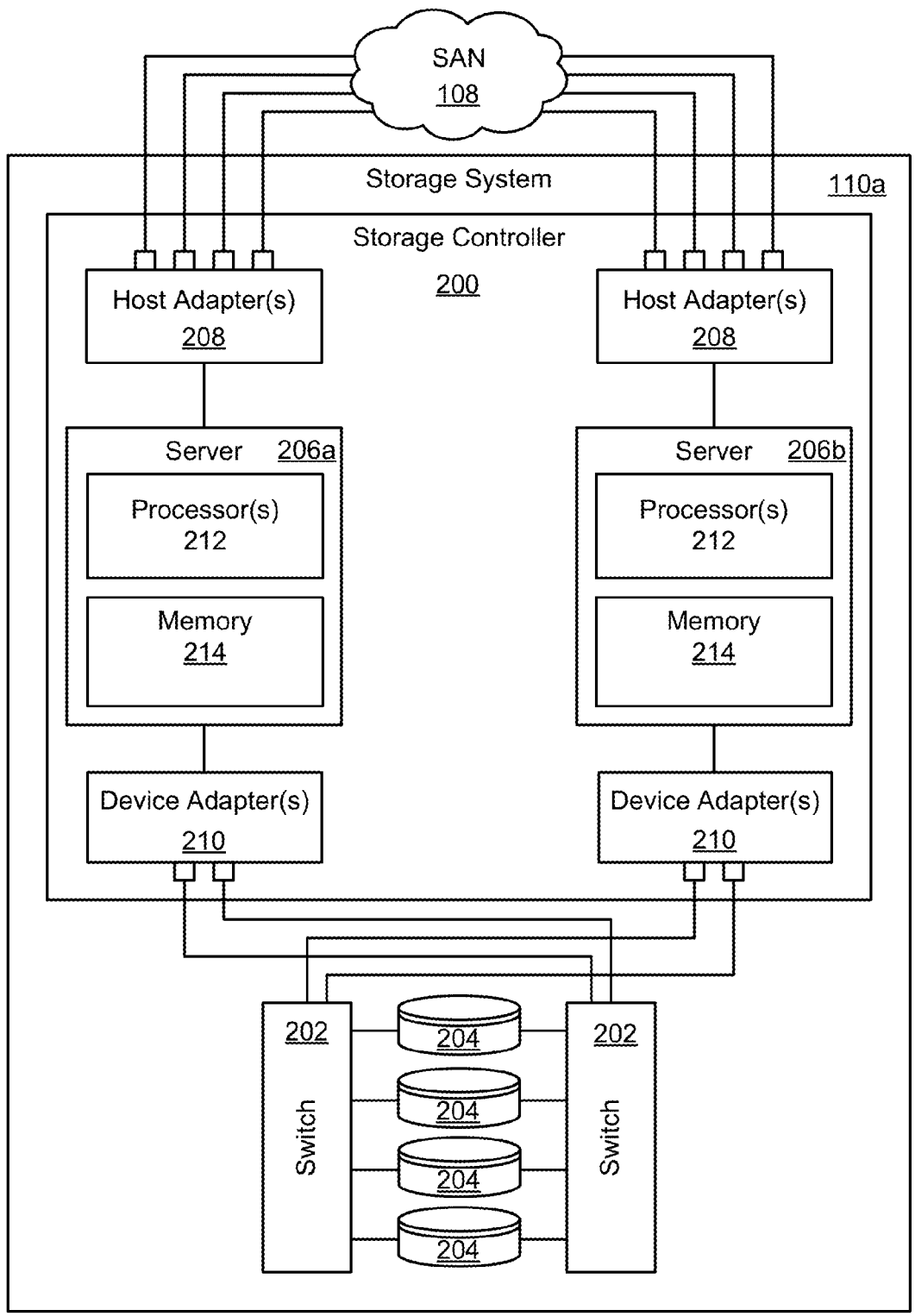
FIG. 2 is a high-level block diagram showing one example of a storage system in which an apparatus and method in accordance with the invention may be implemented.

Referring to FIG. 2, one embodiment of a storage system 110a containing an array of hard-disk drives 204 and/or solid-state drives 204 is illustrated. The internal components of the storage system 110a are shown since the apparatus and methods disclosed herein may, in certain embodiments, be implemented within such a storage system 110a, although the apparatus and methods may also be applicable to other storage systems 110. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

Referring to FIG. 3, in certain embodiments, a storage system 110 and/or the storage architecture 100 may be configured to provide tiered data storage. In such a system, the "hotness" or "coldness" of data may be continually monitored so that it can be optimally placed on different storage tiers 300. For example, faster storage devices 204 (e.g., solid state drives) may make up a first storage tier 300a, intermediate performance storage devices 204 (e.g., hard drives) may make up a second storage tier 300b, while slower storage devices (e.g., tape) may make up a third storage tier 300c. "Hot" (i.e., frequently accessed) data may be placed on the first storage tier 300a to improve I/O performance, while "warm" (i.e., less frequently accessed) data may be placed on the second storage tier 300b, and "cold" (i.e., even less frequently accessed) data may be placed on the third storage tier 300c. As the temperature of the data changes, the data may be migrated between the storage tiers 300a-c to optimize I/O performance. The storage tiers 300a-c may be implemented within a single storage system 110 or potentially distributed across multiple storage systems 110. Similarly, additional (or fewer) tiers 300 may be provided where needed. The example described above is provided only by way of example and not limitation.

In certain embodiments, data may be migrated between tiers 300a-c at the granularity of a block as opposed to the granularity of a file or dataset. In such embodiments, because a file or dataset may include multiple data blocks, some parts of a file or dataset may be placed on or migrated to higher performance storage tiers, while other parts of the file or dataset may be placed on or migrated to lower performance storage tiers. This is due to the fact that some parts of a file or dataset may be accessed frequently while other parts of the file or dataset may be accessed less frequently. Migrating data at the granularity of a block may be utilize storage more efficiently than migrating data at the granularity of a file or dataset.

Referring to FIGS. 4A through 4D, a sequence of heat maps generated for data blocks at various time intervals ($T_1$, $T_2$, $T_3$, $T_4$) is illustrated. In this example, the heat maps are provided to show how temperature increases for certain data blocks may be related to temperature increases of other data blocks.

As previously discussed, an apparatus and method in accordance with the invention may be configured to track temperature of data blocks in a tiered storage architecture, where the temperature indicates how frequently data blocks are accessed. Heat maps may be generated that indicate the temperature of data blocks over different time intervals. FIGS. 4A through 4D are examples of heat maps 400a-d that may be generated to keep track of the temperature of the data blocks over time. These heat maps 400a-d are presented by way of example and not limitation. The heat maps 400a-d are intentionally small for illustration purposes, while recognizing that such heat maps 400 would likely be much larger in real-world implementations.

In the illustrated embodiment, the heat maps 400 are represented by a plurality of pixels, where each pixel represents a different data block. Each pixel has a color or shade to represent a temperature of its corresponding data block. In the illustrated example, four different shades or colors are used to represent the temperature of a corresponding data block, with darker shades or colors representing hotter data and lighter shades or colors representing colder data. These shades or colors are presented only by way of example and not limitation. In reality, temperature may be represented by a far larger (or smaller) set of shades or colors. It should also be recognized that the shades or colors are presented to provide a visual understanding of the invention. Such colors or shades may be unnecessary with computers or other processing entities which may process and/or analyze the heat maps 400. Such computers or processing entities may represent temperature with numbers, characters, or the like, as opposed to with shades or colors.

Figure 4A:
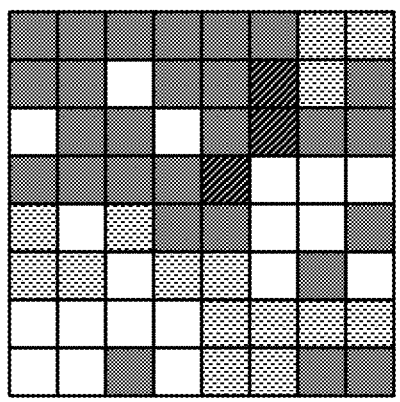
FIGS. 4A through 4D show a sequence of heat maps for data blocks at various time intervals, particularly showing how temperature increases for certain data blocks may trigger or precede temperature increases for other data blocks.
Figure 4B:
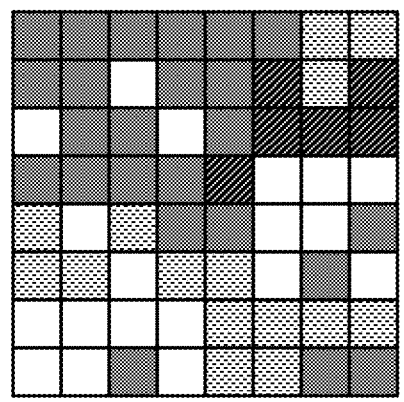
Figure 4C:
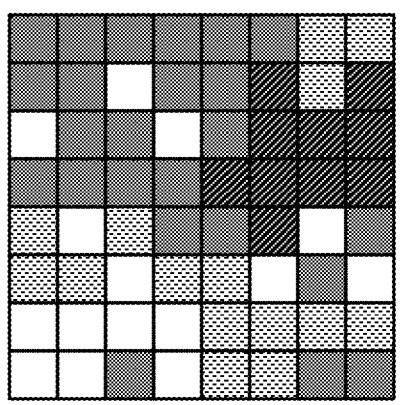
Figure 4D:
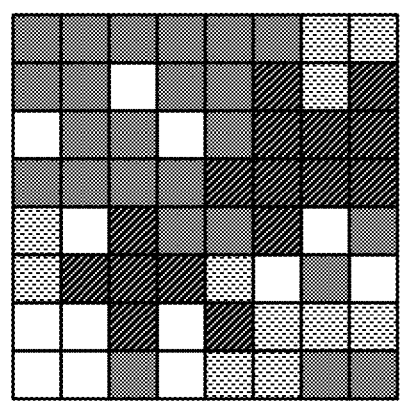
Figure 5A:
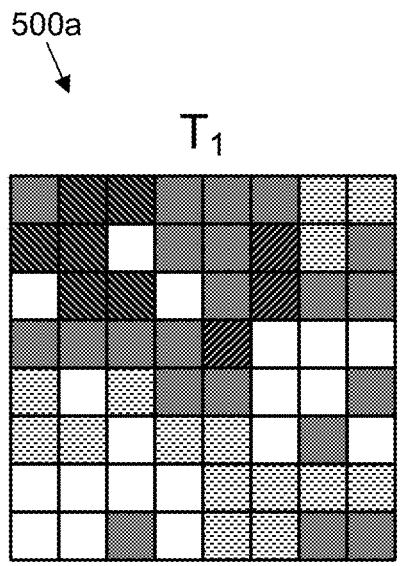
FIGS. 5A through 5D show a sequence of heat maps for data blocks at various time intervals, particularly showing how temperature increases for certain data blocks may trigger or precede temperature decreases for other data blocks.
Figure 5B:
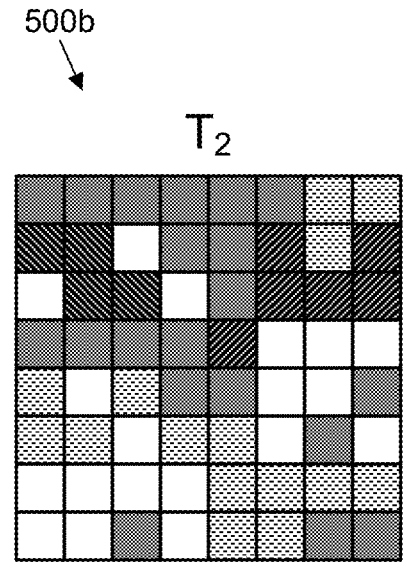
Figure 5C:
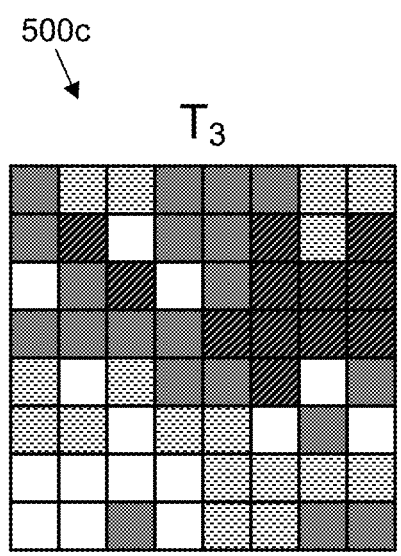
Figure 5D:
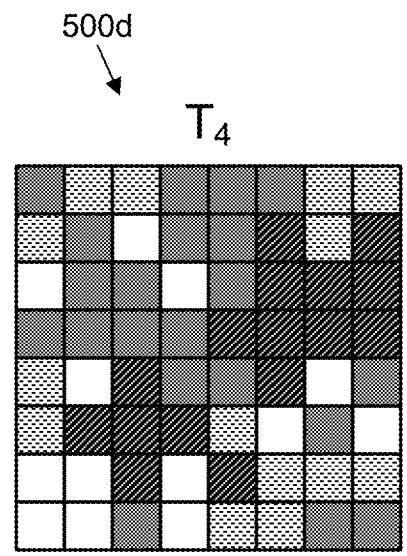
Figure 6A:
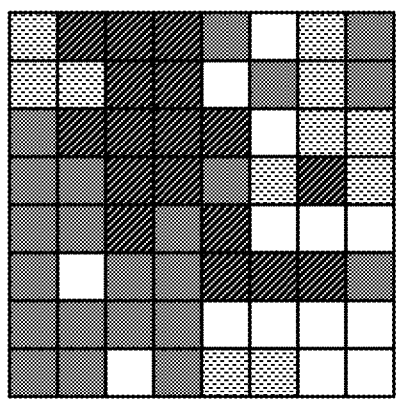
FIGS. 6A through 6D show a sequence of heat maps for data blocks at various time intervals, particularly showing how temperature decreases for certain data blocks may trigger or precede temperature decreases for other data blocks.
Figure 6B:
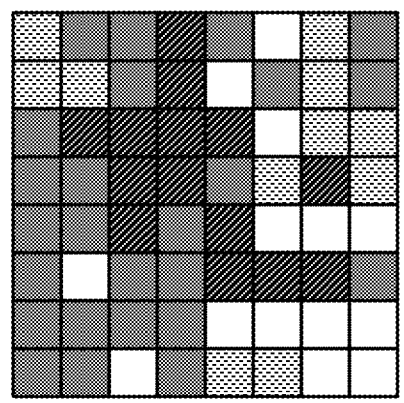
Figure 6C:
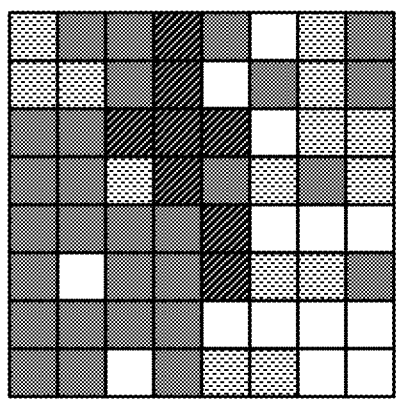
Figure 6D:
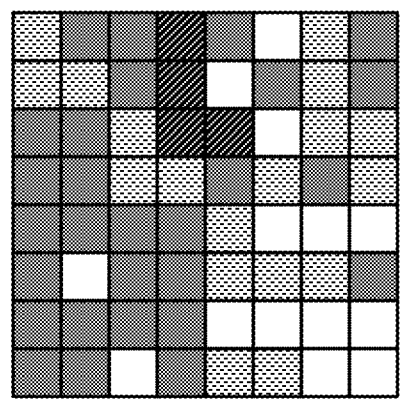
Figure 7A:
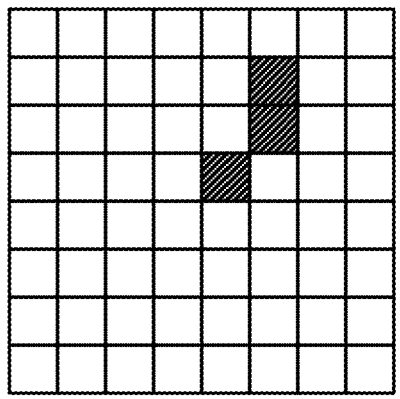
FIGS. 7A through 7D show the heat maps of FIGS. 4A through 4D after superfluous or extraneous information has been filtered out.
Figure 7B:
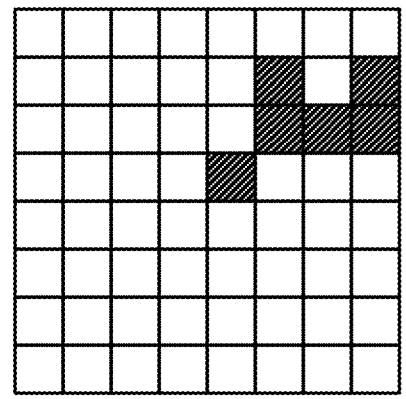
Figure 7C:
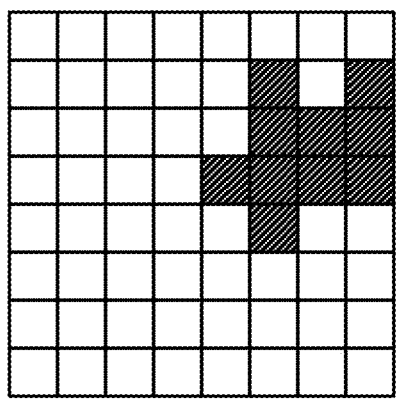
Figure 7D:
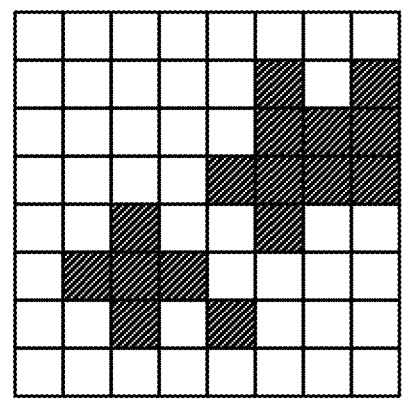

The heat map 400a of FIG. 4A shows a small number of data blocks that are "hot" at time interval $T_1$ (as shown by the three darkest pixels). In certain embodiments, these data blocks may be moved to higher performance storage media to improve I/O performance. The heat map 400b of FIG. 4B shows that after the data blocks of FIG. 4A become hot, additional data blocks become hot during interval $T_2$. These are followed by additional hot data blocks in interval $T_3$ and interval $T_4$. Each of these hot data blocks may be moved to higher performance storage media to improve I/O performance.

In certain cases, a pattern may be inferred from the heat maps 400a-d. For example, if the same pattern or substantially the same pattern repeatedly occurs, an inference may be made that the data blocks that become hot are related to one another. For example, the data blocks may be part of the same file or dataset or related files or datasets. In certain embodiments, the pattern may indicate that parts of a file or dataset or related files or datasets may be accessed in a predictable or recurring order. In other cases, certain data blocks may become hot at certain dates and times and in predictable or recurring orders. For example, end-of-the-day or end-of-the-month processing may cause certain data blocks to become hot at predictable or recurring dates or times. In other cases, data may become hot or cold at certain times of the day or night as demand associated with the data changes. For example, certain data may be in high demand during business hours while other data may be in high demand at night or on weekends. In other cases, a job may operate on or access the same data blocks. In yet other cases, data be unrelated but may be operated on by jobs that run at the same or similar times, thereby creating an apparent relationship between the data.

In certain embodiments, a relationship may be deemed to exist between data blocks when their temperature changes can be correlated. For example, if a second data block is determined to become hot or cold ninety (or other) percent of the times after a first data block becomes hot or cold, a relationship may be deemed to exist between the first data block and the second data block. Temporal proximity may also be taken into account when determining relationships. For example, a relationship may be deemed to exist only if the temperature of a first data block changes within some specified time period (ten seconds, one minute, one hour, etc.) relative to the temperature change of a second data block. Thus, various factors may be taken into consideration when determining whether relationships exist.

In certain embodiments, temperature changes of a first data block may be deemed to trigger temperature changes in a second data block. Thus, when a temperature of the first data block changes, it may be predicated with some level of certainty that the temperature of the second data block will also change. Once a relationship is deemed to exist between data blocks, various anticipative actions (e.g., promoting or demoting data in the tiered storage architecture) may be scheduled or performed to improve data migration processes and data placement in the tiered storage architecture.

Referring to FIGS. 5A through 5D, another exemplary sequence of heat maps 500a-d generated at time intervals ($T_1$, $T_2$, $T_3$, $T_4$) is illustrated. In this example, the heat maps 500a-d are provided to show how temperature increases for certain data blocks may be related to or trigger temperature decreases of other data blocks. These heat maps 500a-d are identical to those illustrated in FIGS. 4A through 4D except that certain data blocks (namely those in the upper left hand corner of the heat maps 500a-d) decrease in temperature as other data blocks (primarily on the right hand side) increase in temperature. These heat maps 500a-d show that certain data blocks may be inversely related, namely that temperature increases of certain data blocks may cause corresponding temperature decreases in other data blocks. Such a scenario may occur, for example, if a job has completed processing on a first set of data blocks, and then begins processing on a second set of data blocks. In such a scenario, the increased temperature of the second set may be correlated with the decreased temperature of the first set.

Referring to FIGS. 6A through 6D, another example of a sequence of heat maps 600a-d generated at time intervals ($T_1$, $T_2$, $T_3$, $T_4$) is illustrated. In this example, the heat maps 600a-d are provided to show how temperature decreases for certain data blocks may be related to or trigger temperature decreases for other data blocks. As shown in FIGS. 6A through 6D, hot data blocks in FIG. 6A begin to cool, which in turn triggers cooling of other data blocks.

Referring to FIGS. 7A through 7D, in certain embodiments, the heat maps previously discussed may be filtered or compressed to remove superfluous or extraneous information. For example, in certain embodiments, only hot data blocks (as represented by darker shades or colors) may be of concern. For example, data migration algorithms may be configured to analyze and make decisions based on hot data blocks while ignoring data blocks of other temperatures. Thus, extraneous shades or colors may be filtered out to leave only desired information. FIGS. 7A through 7D show the heat maps 400a-d of FIGS. 4A through 4D after filtering out shades or colors other than the "hot" shade or color.

Other filtering or compression algorithms may be applied to the heat maps to facilitate analysis, processing, or reduce the size of the heat maps. For example, image processing algorithms or technologies, such as JPEG processing, may be applied to compress the heat maps 400a-d, while still enabling the heat maps 400a-d to retain desired information. Other image compression algorithms may also be used to provide similar benefits. In other embodiments, the size of the heat maps 400a-d may be reduced by decreasing a number of shades or colors represented in the heat maps 400a-d. For example, a large number of temperatures may be reduced to a few discrete temperatures or temperature ranges to save space.

Figure 8:
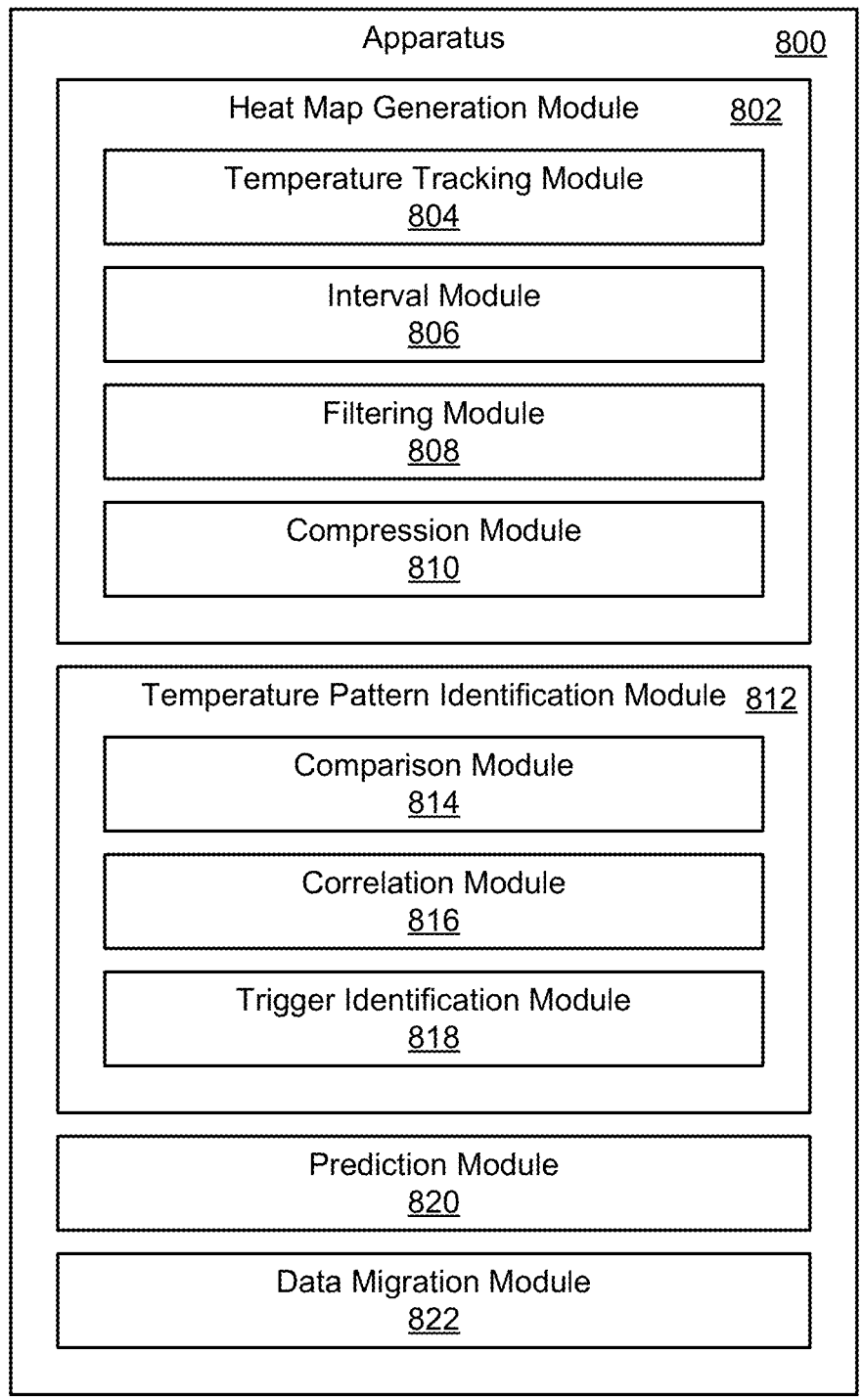
FIG. 8 is a high-level block diagram showing an apparatus comprising various modules for providing various features and functions in accordance with the invention.

Referring to FIG. 8, one embodiment of an apparatus 800 in accordance with the invention is illustrated. As shown, the apparatus 800 includes one or more modules that provide various features and functions. These modules may be implemented in hardware, software or firmware executable on hardware, or a combination thereof. The modules are presented only by way of example and are not intended to be limiting. Indeed, alternative embodiments may include additional or fewer modules than those illustrated, or the modules may be organized differently. Furthermore, in some embodiments, the functionality of some modules may be broken into multiple modules or, conversely, the functionality of several modules may be combined into a single or fewer modules.

As shown, in certain embodiments, the apparatus 800 includes one or more of a heat map generation module 802, temperature pattern identification module 812, prediction module 820, and data migration module 822. The heat map generation module 802 may include one or more of a temperature tracking module 804, interval module 806, filtering module 808, and compression module 810. The temperature pattern identification module 812 may include one or more of a comparison module 814, correlation module 816, and trigger identification module 818.

The heat map generation module 802 may be configured to generate heat maps for data blocks in a tiered storage architecture. To accomplish this, the heat map generation module 802 may include a temperature tracking module 804 to monitor and track the temperature of data blocks in the tiered storage architecture and an interval module 806 to capture or sample the temperature of the data blocks at designated intervals. In certain embodiments, a filtering module 808 filters out extraneous or superfluous information, such as temperature information that is unneeded when performing analysis or other processes. In certain embodiments, a compression module 810 compresses the heat maps. As previously mentioned, in certain embodiments, various image compression algorithms, such as JPEG compression algorithms, may be used to compress the heat maps.

A temperature pattern identification module 812 may be configured to identify patterns in the heat maps, which may in turn be used to identify relationships between data blocks. Patterns may include those that occur at predictable times and/or dates as well as usage patterns that occur in predictable orders or sequences but do not necessarily occur at predictable times and/or dates. To identify patterns, the temperature pattern identification module 812 may include a comparison module 814 to compare the heat maps generated by the heat map generation module 802, and identify changes or differences in the heat maps. In certain embodiments, the comparison module 814 may stream the heat maps (like frames in a movie) to identify temperature changes or patterns occurring over time.

The correlation module 816 may be used to identify correlations between temperature changes of certain data blocks with temperature changes of other data blocks. For example, if a data block is determined to change temperature with some consistency before or after another data block changes temperature, a relationship may be deemed to exist between the data blocks. In certain embodiments, a trigger identification module 818 may identify a triggering data block. A change in temperature of a triggering data block may precede temperature changes of related data blocks. It follows that a change in temperature of a triggering data block may be used to trigger anticipative actions (e.g., data migration) for related data blocks.

A prediction module 820 may be configured to make predictions based on the temperature patterns or relationships identified by the temperature pattern identification module 812. For example, based on identified patterns, the prediction module 820 may predict that certain data blocks will change temperature at certain times or dates. In other cases, the prediction module 820 may predict that certain data blocks will change temperature based on temperature changes of other data blocks (e.g., triggering data blocks). Thus, the prediction module 820 may predict changes in temperature at selected times and/or dates as well as changes in temperature that may occur at uncertain or variable times and/or dates (as may occur with usage patterns).

A data migration module 822 may migrate data based on the predications of the prediction module 820. For example, if the prediction module 820 predicts that certain data blocks are going to change temperature at certain dates and/or times, the data migration module 822 may migrate (i.e., promote or demote) the data blocks to appropriate storage tiers in anticipation of the changes in temperature. For example, if selected data blocks are predicated to heat up, these data blocks may be moved to higher performance storage media in anticipation of the increased demand. This will ensure that when data access requirements increase, the data blocks will already be on higher performance storage media (thereby avoiding reduced I/O performance caused by moving the data blocks during periods of high demand). Similarly, if one or more triggering data blocks change temperature, the data migration module 822 may migrate related data blocks to appropriate storage media in anticipation of their change in temperature. Thus, the data migration module 822 may move data to appropriate storage tiers in anticipation of future temperature changes. This may include moving data blocks to higher or lower performance storage tiers based on the direction of the predicated temperature change.

The modules illustrated in FIG. 8 may be configured to continuously validate patterns and relationships over time. Certain patterns and relationships may change over time. The illustrated modules may be configured to continuously monitor and update temperature information and update their analysis, predictions, and data migration actions as patterns and relationships change over time.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. An apparatus for migrating data in a tiered storage architecture, the apparatus comprising:
   at least one processor;
   at least one memory device coupled to the at least one processor and storing instructions for execution by the at least one processor, the instructions causing the at least one processor to:
      track temperature of data blocks in a tiered storage architecture, the temperature indicating a frequency of access of the data blocks;
      generate heat maps indicating the temperature of the data blocks across different time intervals;
      process the heat maps using an image processing algorithm;
      compress the heat maps to reduce the size of the heat maps;
      compare the heat maps from the time intervals to identify temperature patterns occurring over time;

predict, from the temperature patterns, when selected data blocks will change in temperature; and migrate the selected data blocks between tiers of the tiered storage architecture in anticipation of their changes in temperature.

2. The apparatus of claim 1, wherein the instructions further cause the at least one processor to identify correlations between temperature changes of certain data blocks with temperature changes of other data blocks.

3. The apparatus of claim 2, wherein the instructions further cause the at least one processor to identify data blocks whose temperature changes trigger temperature changes in other data blocks.

4. The apparatus of claim 1, wherein the heat maps are represented by a plurality of pixels, where each pixel represents a data block and has at least one of a color and shade to represent a temperature of its corresponding data block.

5. The apparatus of claim 4, wherein compressing the heat maps comprises reducing a number of colors that are represented by the plurality of pixels.

6. The apparatus of claim 4, wherein compressing the heat maps comprises reducing a number of shades that are represented by the plurality of pixels.

7. The apparatus of claim 1, wherein the instructions further cause the at least one processor to filter, using the image processing algorithm, the heat maps to remove superfluous information.

8. The apparatus of claim 1, wherein the instructions further cause the at least one processor to migrate the selected data blocks in response to changes in temperature of associated triggering data blocks.

9. The apparatus of claim 1, wherein compressing the heat maps comprises compressing the heat maps using the image processing algorithm.

10. The apparatus of claim 1, wherein the image processing algorithm is a JPEG image processing algorithm.

11. The apparatus of claim 1, wherein comparing the heat maps comprises streaming the heat maps like frames in a movie to identify at least one of temperature changes and patterns occurring over time.

* * * * *